United States Patent [19]

Ikeda et al.

[11] Patent Number: 4,585,483

[45] Date of Patent: Apr. 29, 1986

[54] RECORDING MATERIALS

[75] Inventors: Kensuke Ikeda, Shizuoka; Ken Iwakura; Masato Satomura, both of Kanagawa, all of Japan

[73] Assignee: Fuji Photo Film Co., Ltd., Kanagawa, Japan

[21] Appl. No.: 612,218

[22] Filed: May 21, 1984

[30] Foreign Application Priority Data

May 20, 1983 [JP] Japan ........ 58-88937

[51] Int. Cl.$^4$ ........ C09D 11/00

[52] U.S. Cl. ........ 106/21; 346/216; 427/150; 427/151

[58] Field of Search ........ 106/21; 427/150, 151, 427/148; 346/216

[56] References Cited

U.S. PATENT DOCUMENTS

| | | | |
|---|---|---|---|
| 3,453,107 | 7/1969 | Idelson | 430/243 |
| 4,199,355 | 4/1980 | Hinshaw et al. | 430/362 |
| 4,248,956 | 2/1981 | Baigrie et al. | 430/243 |
| 4,267,251 | 5/1981 | Locatell, Jr. et al. | 430/224 |
| 4,277,553 | 7/1981 | Onodera et al. | 430/223 |
| 4,316,621 | 2/1982 | Petitpierre | 346/216 |
| 4,453,744 | 6/1984 | Wurmli et al. | 346/216 |

FOREIGN PATENT DOCUMENTS

| | | |
|---|---|---|
| 1465183 | 2/1977 | United Kingdom . |
| 2122763 | 1/1984 | United Kingdom . |

*Primary Examiner*—Amelia B. Yarbrough
*Attorney, Agent, or Firm*—Sughrue, Mion, Zinn, Macpeak and Seas

[57] ABSTRACT

A recording material is disclosed which contains an electron donating colorless dye and an electron accepting compound. The electron accepting compound is an aromatic compound having a substituted or unsubstituted sulfamoyl group and a hydroxyl group as substituents. The recording material can provide high density images which provide sufficient fastness during storage.

20 Claims, No Drawings

RECORDING MATERIALS

FIELD OF THE INVENTION

The present invention relates to recording materials wherein a color reaction between an electron donating colorless dye and an electron accepting compound is utilized. Particularly, the present invention relates to recording materials containing as an electron accepting compound an aromatic compound having a substituted or unsubstituted sulfamoyl group and a hydroxyl group as substituents.

The electron accepting compounds according to the present invention are very useful as electron accepting compounds for, particularly, pressure-sensitive recording materials and heat-sensitive recording materials. Further, they are compounds which can be applied to electric heat-sensitive recording sheets, light-sensitive recording sheets, ultrasonic wave recording sheets, electron ray recording sheets, electrostatic recording sheets, light-sensitive printing plates, materials for printing, typewriter ribbons, inks for ball point pens and crayons, etc.

BACKGROUND OF THE INVENTION

It has been described in U.S. Pat. Nos. 3,244,549 and 3,244,550, and British Pat. No. 1,135,540, etc. that various phenol compound are used as electron accepting compounds for pressure-sensitive recording materials or heat-sensitive recording materials. However, these phenol compounds are not always satisfactory. Namely, their color density is insufficient when used in combination with an electron donating colorless dye, and the fastness to light and moisture of the colored material after coloration is not sufficient.

With respect to sulfone compounds known hitherto, bisphenol S causes substantial fogging on the background (coloration of the part where printing was not carried out) or substantial fogging due to moisture, because it has considerable water-solubility. Further, hydroxydiphenyl sulfone compounds disclosed in European Patent Publication No. 67793 are not satisfactory electron accepting compounds, because they cause substantial fog due to their water solubility and provide images of low color density.

SUMMARY OF THE INVENTION

Accordingly, an object of the present invention is to provide recording materials in which the color density is sufficient when used in combination with an electron donating colorless dye and which provides images having sufficient fastness after coloration.

Objects of the present invention have been attained by providing recording materials containing an electron donating colorless dye and an aromatic compound having a substituted or unsubstituted sulfamoyl group and a hydroxyl group as substituents, as an electron accepting compound.

DETAILED DESCRIPTION OF THE INVENTION

Preferred examples of the electron accepting compounds according to the present invention are represented by the following general formulae (I) to (III).

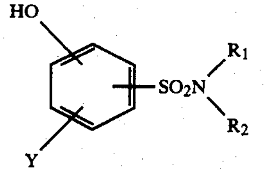
(I)

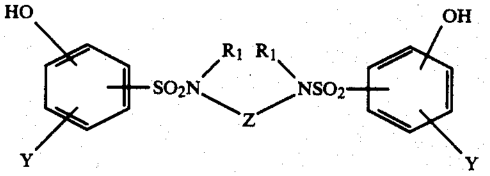
(II)

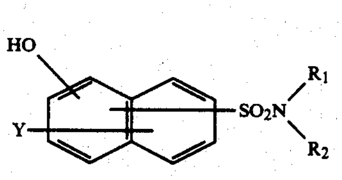
(III)

In the above described general formulae (I) to (III), $R_1$ and $R_2$ which may be identical or different represent each a hydrogen atom, an alkyl group, an aralkyl group or an aryl group, which may be substituted by alkyl groups, halogen atoms, alkoxy groups or hydroxyl group.

Y represents a hydrogen atom, an alkyl group, an aryl group, an aralkyl group, a halogen atom, a hydroxyl group or an electron attractive group.

Examples of useful electron attractive groups include:

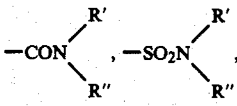 , —COR, $CO_2R$, $—SO_2R$ and —CN, etc. (wherein R, R′ and R″ represent each a hydrogen atom, an alkyl group, an aralkyl group or an aryl group).

Z represents an alkylene residue, an arylene residue or $—R_3—X—R_4—$ (wherein $R_3$ and $R_4$ which may be identical or different represent each an alkylene residue and X represents an arylene residue or an oxygen atom). The aromatic ring having a hydroxyl group and a sulfamoyl group may have further substituents.

In the above described general formulae (I) to (III), it is preferred that $R_1$ represents a hydrogen atom or an alkyl group having 1 to 8 carbon atoms and it is particularly preferred that $R_1$ represents a hydrogen atom or an alkyl group having 1 to 4 carbon atoms.

It is preferred that $R_2$ represents a hydrogen atom, an alkyl group having 1 to 8 carbon atoms, an aralkyl group having 7 to 12 carbon atoms, or an aryl group having 6 to 12 carbon atoms. It is particularly preferred that $R_2$ represents a hydrogen atom, an alkyl group having 1 to 6 carbon atoms, an aralkyl group having 7 to 10 carbon atoms, an aryl group having 6 to 10 carbon atoms, a halogen substituted aryl group, an alkoxy substituted aryl group or a hydroxyl substituted aryl group.

It is preferred that Y represents a hydrogen atom, an alkyl group having 1 to 8 carbon atoms, an aralkyl group having 7 to 12 carbon atoms, an aryl group having 6 to 12 carbon atoms, a chlorine atom, a bromine atom, a hydroxyl group or an electron attractive group having 18 or less carbon atoms. It is particularly preferred that Y represents a hydrogen atom, an alkyl group having 1 to 4 carbon atoms, an aralkyl group having 7 to 9 carbon atoms, an aryl group having 6 to 9 carbon atoms, a chlorine atom, a hydroxyl group, an acyl group having 1 to 8 carbon atoms, a substituted carbamoyl group having 2 to 9 carbon atoms, a sulfonyl group having 1 to 8 carbon atoms or a substituted sulfamoyl group having 1 to 8 carbon atoms. When Y represents a hydroxyl group, it is particularly preferred that $R_1$ represents a hydrogen atom or an alkyl group having 1 to 4 carbon atoms and $R_2$ represents an aralkyl group having 7 to 10 carbon atoms.

It is preferred that Z represents an alkylene residue having 2 to 10 carbon atoms, an arylene residue having 6 to 12 carbon atoms or $—R_3—X—R_4—$ having 2 to 12 carbon atoms.

In the electron accepting compounds according to the present invention, the position of the sulfamoyl group with respect to the hydroxyl group is arbitrary, but a conjugating position to the hydroxyl group is preferred and ortho- or para-position is more preferred. However, when Y represents a hydroxyl group, it is particularly preferred that the position of one hydroxyl group (Y) with respect to the other hydroxyl group is meta-position.

Particularly preferred examples of the electron accepting compounds are represented by the following general formulae (IV) to (VI).

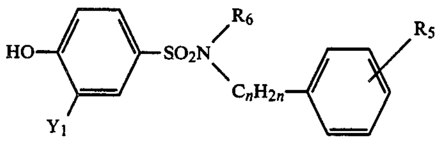
(IV)

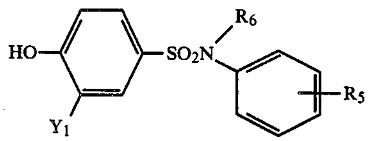
(V)

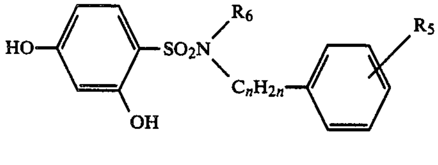
(VI)

In the above described general formulae (IV) to (VI), $R_6$ represents a hydrogen atom or an alkyl group having 1 to 4 carbon atoms, $R_5$ represents a hydrogen atom, an alkyl group having 1 to 4 carbon atoms, an alkoxy group having 1 to 4 carbon atoms or a chlorine atom, $Y_1$ represents a hydrogen atom, an alkyl group having 1 to 4 carbon atoms or a chlorine atom, and n is an integer from 1 to 4.

When using the electron accepting compounds according to the present invention for heat-sensitive recording materials, it is preferred that they have a melting point of 50° C. or more and, particularly, a melting point of 70° C. to 200° C.

Characteristics of electron accepting compounds of the present invention are as follows.

(1) It forms a color image having a high density by combining with an electron donating colorless dye.

(2) The color image is stabilized and the degree of fading over the passage of time, when exposed to moisture or light, etc. is low.

(3) It has low water solubility.

(4) It is not sublimed and is stable.

(5) it is easily synthesized, and it can be obtained in high purity and in a high yield. Further, raw materials are cheap.

In the following, examples of the electron accepting compounds of the present invention are described, but the present invention is not limited to them.

The typical examples of the electron accepting compounds include p-N-butylsulfamoylphenol, p-N-hexylsulfamoylphenol, p-N-benzylsulfamoylphenol, p-N-(3-chlorobenzyl)sulfamoylphenol, p-N-α-methylbenzylsulfamoylphenol, p-N-β-phenetylsulfamoylphenol, 2-chloro-4-N-benzylsulfamoylphenol, 2-methyl-4-N-benzylsulfamoylphenol, 3-methyl-4-N-benzylsulfamoylphenol, p-N-phenylsulfamoylphenol, p-N-3-tolylsulfamoylphenol, p-N-2-tolylsulfamoylphenol, p-N-(2-chlorophenyl)sulfamoylphenol, p-N-(3-methoxyphenyl)sulfamoylphenol, p-N-(3-hyroxyphenyl)sulfamoylphenol, p-N-(4-hydroxyphenyl)sulfamoylphenol, 2-chloro-4-N-phenylsulfamoylphenol, 2-chloro-4-N-(3-hydroxyphenyl)sulfamoylphenol, 2-chloro-4-N-(hydroxyphenyl)sulfamoylphenol, p-N-ethyl-N-phenylsulfamoylphenol, p-N-methyl-N-benzylsulfamoylphenol, N,N'-dimethyl-N,N'-bis-p-hydroxyphenylsulfonylethylenediamine, N,N'-bis-p-hydroxyphenylsulfonylpropylenediamine, N,N'-bis-(p-hydroxyphenylsulfonyl)-m-xylylenediamine, N,N'-bis-(p-hydroxyphenylsulfonyl)-p-xylylenediamine, N,N'-bis-(p-hydroxyphenylsulfonyl)-m-phenylenediamine, N,N'-bis-(3-chloro-4-hydroxyphenylsulfonyl)propylenediamine, N,N'-bis-(3-chloro-4-hydroxyphenylsulfonyl)-1,4-diaminobutane, N,N'-bis-(3-chloro-4-hydroxyphenylsulfonyl)-m-xylylenediamine, 4-N-benzylsulfamoyl-1-naphthol, 5-N-benzylsulfamoyl-1-naphthol, 6-N-benzylsulfamoyl-2-naphthol, 8-N-benzylsulfamoyl-2-naphthol, 6,8-bis-(N-benzylsulfamoyl)-2-naphthol, 6,8-bis-(N-butylsulfamoyl)-2-naphthol, 3-hydroxy-4-N-benzylsulfamoylphenol and 3-hydroxy-4-N-methyl-N-benzylsulfamoylphenol, etc., preferably p-N-butylsulfamoylphenol, p-N-hexylsulfamoylphenol, p-N-benzylsulfamoylphenol, p-N-(3-chlorobenzyl)sulfamoylphenol, p-N-α-methylbenzylsulfamoylphenol, p-N-β-phenetylsulfamoylphenol, 2-chloro-4-N-benzylsulfamoylphenol, p-N-ethyl-N-phenylsulfamoylphenol, p-N-methyl-N-benzylsulfamoylphenol, N,N'-dimethyl-N,N'-bis-p-hydroxyphenylsulfonylethylenediamine, 3-hydroxy-4-N-benzylsulfamoylphenol and 3-hydroxy-4-N-methyl-N-benzylsulfamoylphenol. They are used along or as a mixture of them or as a mixture with other electron accepting compounds (for example, bisphenol A or 4-hydroxybenzoic acid benzyl ester, etc.).

The electron accepting compounds according to the present invention are synthesized by known processes. For example, they are obtained by reacting a compound represented by the following general formula (VII) with a compound represented by the following general formula (VIII) in a nonaqueous medium in the presence of a base.

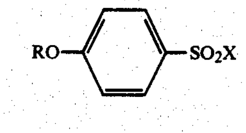

(VII)

(wherein R represents a hydrogen atom, an acyl group or a lower alkyl group, and X represents a halogen atom).

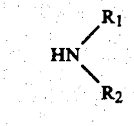

(VIII)

(wherein $R_1$ and $R_2$ represent each the same meaning as described above).

They have been described in, for example, Beilstein Handbuck der Organischen Chemie, EI, 12, page 434.

Electron donating colorless dyes used in the present invention include triarylmethane compounds, diphenylmethane compounds, xanthene compounds, thiazine compounds and spiropyran compounds, etc. Some examples of them are as follows. Useful triarylmethane compounds include 3,3-bis-(p-dimethylaminophenyl)-6-dimethylaminophthalide (Crystal Violet lactone), 3,3-bis-(p-dimethylaminophenyl)phthalide, 3-(p-dimethylaminophenyl)-3-(1,3-dimethylindol-3-yl)phthalide and 3-(p-dimethylaminophenyl)-3-(2-methylindol-3-yl)phthalide, etc. Useful diphenylmethane compounds include 4,4'-bis-dimethylaminobenzohydrin benzyl ether, N-halophenyl leuco Auramine and N-2,4,5-trichlorophenyl leuco Auramine, etc. Useful xanthene compounds include Rhodamine B anilinolactam, Rhodamine (p-nitroanilino)lactam, Rhodamine B (p-nitroanilino)lactam, 2-dibenzylamino-6-diethylaminofluoran, 2-anilino-6-diethylaminofluoran, 2-anilino-3-methyl-6-diethylaminofluoran, 2-anilino-3-methyl-6-cyclohexylmethylaminofluoran, 2-o-chloroanilino-6-diethylaminofluoran, 2-m-chloroanilino-6-diethylaminofluoran, 2-(3,4-dichloroanilino)-6-diethylaminofluoran, 2-octylamino-6-diethylaminofluoran, 2-dihexylamino-6-diethylaminofluoran, 2-m-trichloromethylanilino-6-diethylaminofluoran, 2-butylamino-3-chloro-6-diethylaminofluoran, 2-ethoxyethylamino-3-chloro-6-diethylaminofluoran, 2-anilino-3-chloro-6-diethylaminofluoran, 2-diphenylamino-6-diethylaminofluoran, 2-anilino-3-methyl-6-diphenylaminofluoran, 2-anilino-3-methyl-5-chloro-6-diethylaminofluoran, 2-anilino-3-methyl-6-diethylamino-7-methylfluoran, 2-anilino-3-methoxy-6-dibutylaminofluoran, 2-o-chloroanilino-6-dibutylaminofluoran, 2-p-chloroanilino-3-ethoxy-6-diethylaminofluoran, 2-anilino-3-pentadecyl-6-diethylaminofluoran, 2-anilino-3-methyl-6-N-ethyl-N-isoamylaminofluoran, 2-anilino-3-methyl-6-N-ethyl-N-γ-methoxypropylaminofluoran, 2-diethylamino-3-phenyl-6-diethylaminofluoran and 2-phenyl-6-diethylaminofluoran, etc. Useful thiazine compounds include benzoyl leuco Methylene Blue and p-nitrobenzyl leuco Methylene Blue, etc. Useful spiro compounds include 3-methyl-spirodinaphthopyran, 3-ethyl-spiro-dinaphthopyran, 3,3'-dichlorospiro-dinaphthopyran, 3-benzyl-spiro-dinaphthopyran, 3-methyl-naphtho(3-methoxybenzo)spiropyran and 3-propyl-spirodibenzopyran, etc. These compounds may be used alone or as a mixture of them.

In the following, a process for producing recording materials of the present invention is illustrated.

The pressure-sensitive copying paper of the present invention may have various forms as described in U.S. Pat. Nos. 2,505,470, 2,505,471, 2,505,489, 2,548,366, 2,712,507, 2,730,456, 2,730,457 and 3,418,250, etc. Most generally, it consists of a pair of sheets wherein an electron donating colorless dye and an electron accepting compound of the present invention are contained, respectively. Namely, one or more electron donating colorless dyes are dissolved in a solvent (synthetic oils such as alkylated naphthalene, alkylated diphenyl, alkylated diphenylmethane or alkylated terphenyl, etc.; vegetable oils such as cotton seed oil or castor oil, etc.; animal oils, mineral oils or mixtures of them, etc.). After the resulting solution is dispersed in a binder or is contained in microcapsules, it is applied to a base such as paper, plastic sheet or resin coated paper, etc. to produce a color former sheet. Further, one or more of electron accepting compounds are dispersed alone or together with other electron accepting compounds in a binder such as styrene-butadiene latex or polyvinylalcohol, and the resulting dispersion is applied to a base such as paper, plastic sheet or resin coated paper, etc. to produce a color developer sheet.

Amounts of the electron donating colorless dyes and the electron accepting compounds depend upon the desired thickness of the coating layer, the form of pressure-sensitive copying paper, the process for producing capsules and other conditions. Accordingly, they may be suitably selected according to such conditions. Those skilled in the art can easily determine the amount needed. The preferred amounts of each component composing the color developer sheet of the pressure-sensitive recording materials are 0.1 to 6 g of the electron accepting compounds, 0 to 10 g of pigments and 0.1 to 10 g of binders, based on 1 $m^2$ of the color developer sheet.

Examples of the process for producing capsules include a process utilizing coacervation of hydrophilic colloid described in U.S. Pat. Nos. 2,800,457 and 2,800,458 and an interfacial polymerization process described in British Pat. Nos. 867,797, 950,443, 989,264 and 1,091,076, etc.

In order to produce the heat-sensitive recording materials, electron donating colorless dye, electron accepting compounds according to the present invention and, if necessary, thermally fusible substances are finely powdered and mixed with a solution prepared by dissolving or dispersing a binder in a solvent or a dispersion medium, and inorganic pigments such as kaolin, talc or calcium carbonate, etc. are added to the resulting mixture to prepare a coating solution, as described in, for example, U.S. Pat. No. 4,341,403. If necessary, paraffin wax emulsions, latex binders, sensitivity increasing agents, metal soaps, antioxidants and ultraviolet ray absorbing agents, etc. may be added to the coating solutions.

The coating solution is applied to a base such as paper, plastic sheet or resin coated paper, etc. and dried. When preparing the coating solution, the whole components may be mixed in the beginning and powdered at the same time, or they may be mixed after suitable combinations of them are powdered and dispersed, respectively.

Further, the coating solution may be introduced into the base by paper making.

The preferred amounts of each component composing the heat-sensitive recording materials are 0.1 to 2 g of the electron donating colorless dyes, 0.1 to 6 g of the electron accepting compounds, 0 to 6 g of the thermally fusible substances, 0 to 10 g of pigments and 0.1 to 10 g of binders, based on 1 $m^2$ of the heat-sensitive recording material.

The electron donating colorless dyes may be used alone or as a mixture of two or more of them. As the dispersion medium (solvent), water is most suitable.

Examples of the binders used in the present invention include styrene-butadiene copolymers, alkyd resins, acrylamide copolymers, vinyl chloride-vinyl acetate copolymers, styrene-maleic acid anhydride copolymers, synthetic rubbers, gum arabic, polyvinyl alcohol and hydroxyethyl cellulose, etc.

Particularly, water soluble binders such as gum arabic, polyvinyl alcohol, hydroxymethyl cellulose or carboxymethyl cellulose, etc. are suitable in relation to the dispersion medium (solvent).

Useful thermally fusible substances include one or more of stearic acid anilide, benzoic, α-naphthol benzoate, β-naphthol p-methylbenzoate, p-t-butylphenol phenoxyacetate, p-phenylphenol p-chlorophenoxyacetate, 4,4'-cyclohexylidene diphenoldiacetate, 4,4'-isopropylidene dimethoxybenzene, β-phenylethyl-p-phenyl ether, 2-p-chlorobenzyloxynaphthalene, 2-benzyloxynaphthalene, 1-benzyloxynaphthalene, 2-phenoxyacetyloxynaphthalene, N-octadecylurea, N-hexadecylurea, N,N'-didodecylurea, phenylcarbamoyloxydodecane, stearic acid amide, behenic acid amide, behenic acid, stearic acid, erucic acid, palmitic acid, methyl p-hydroxybenzoate, diphenyl phthalate, triphenyl phosphate, p-hydroxydiphenyl ether, 2,2-bis[4-(β-hydroxyethoxy)phenyl]propane, p-bis(β-hydroxyethoxy)benzene, phenyl-1-hydroxy-2-naphthoate, benzyl-4-benzyloxybenzoate, 1-methoxycarbonyl-4-N-octadecylcarbamoylbenzene and hydroquinone diacetate, etc.

These substances are colorless solids at normal temperature, which have a sharp melting point at a temperature suitable for copying by heating, namely, a temperature in a range of from 70° to 160° C.

In the following, examples are described. However, the present invention is not restricted to these examples.

EXAMPLE 1

(1) Preparation of color former sheet 1 g of 2-anilino-3-methyl-6-diethylaminofluoran which was the electron donating colorless dye was dissolved in 30 g of alkylated naphthalene. The resulting solution was added to 50 g of water dissolving 6 g of gelatine and 4 g of gum arabic with vigorous stirring to emulsify the solution. After formation of oil drops having a diameter of 1μ to 10μ, 250 g of water was added thereto. The pH was adjusted to about 4 by adding acetic acid little by little to cause coacervation, by which a wall composed of gelatine and gum arabi was formed around the oil drop. The pH was increased to 9 by adding formalin to harden the wall.

The resulting microcapsule dispersion was applied to a paper base and dried to obtain a color former sheet.

(2) Preparation of color developer sheet 20 g of p-N-benzylsulfamoylphenol which was the electron accepting compound was dispersed in 200 g of a 5% aqueous solution of polyvinyl alcohol. Further, 20 g of kaolin (Georgia Kaolin) was added and thoroughly dispersed therein to prepare a coating solution. The resulting coating solution was applied to a paper base and dried to obtain a color developer sheet.

When pressure or impact was applied to the resulting color former sheet and the resulting color developer sheet in contact, a black printed image was quickly obtained. This image had high density and was excellent in light resistance and heat resistance.

EXAMPLE 2

5 g of 2-anilino-3-methyl-6-N-methyl-N-cyclohexylaminofluoran which was the electron donating colorless dye was dispersed in 50 g of a 5% aqueous solution of polyvinyl alcohol (saponification value: 99%, degree of polymerization: 1000) by processing in a ball mill for 24 hours. On the other hand, likewise, 10 g of p-N-benzylsulfamoylphenol which was the electron accepting compound was dispersed in 100 g of a 5% aqueous solution of polyvinyl alcohol by processing in a ball mill for 24 hours. After the two resulting dispersions were mixed, 20 g of kaolin (Georgia Kaolin) was added and thoroughly dispersed. Further, 5 g of a 50% by weight dispersion of paraffin wax emulsion (Cellosol #428, producted by Chukyo Yushi Co.) was added thereto to prepare a coating solution.

The coating solution was applied to a base paper having an areal weight of 50 g/$m^2$ so as to result in a solid coating amount of 6 g/$m^2$, and dried at 60° C. for 1 minute to obtain a coated paper.

When the coated paper was subjected to thermal development at a heat energy of 40 mJ/$mm^2$ by facsimile (Type EF-22 made by Matsushita Denso Co., Ltd.), black printed images were obtained.

The resulting color images were excellent in light resistance and heat resistance.

EXAMPLE 3

A coated paper was obtained in the same manner as in Example 2, except that 5 g of 2-o-chloroanilino-6-diethylaminofluoran was used instead of the electron donating colorless dye of Example 2 and 6 g of p-N-benzylsulfamoylphenol and 4 g of 2,2-bis(4-hydroxyphenyl)propane were used as the electron accepting compounds.

When the coated paper was subjected to development by a facsimile, black printed images were obtained.

EXAMPLE 4

1.5 g of 2-anilino-3-chloro-6-diethylaminofluoran which was the electron donating colorless dye and 0.5 g of 2-chloro-4-(N-benzylsulfamoyl)phenol which was the electron accepting compound were dissolved in 100 ml of acetone, and the resulting solution was applied to a base paper so as to result in a dry coating amount of 1.0 g/$m^2$. When the color density was measured by Macbeth RD-514 reflection densitometer (using visual filter), it was 0.79.

EXAMPLE 5

Using 1.5 g of the electron accepting compound in Example 4, the same experiment as in Example 4 was carried out. The color density was 1.03.

COMPARATIVE EXAMPLE 1

The same experiment as in Example 4 was carried out using 0.5 g of 2,2-bis-(4-hydroxyphenyl)propane as the electron accepting compound instead of the electron accepting compound in Example 4. The color density was 0.55.

COMPARATIVE EXAMPLE 2

The same experiment as in Comparative Example 1 was carried out using 1.5 g of the electron accepting compound in Comparative Example 1. The color density was 0.96.

COMPARATIVE EXAMPLE 3

The same experiment as in Example 4 was carried out using 0.5 g of zinc 3,5-bis(α-methylbenzyl)salicylate as the electron accepting compound instead of the electron accepting compound in Example 4. The color density was 0.50.

It is obvious from comparison between Examples 4 and 5 and Comparative Examples 1, 2 and 3 that the electron accepting compounds of the present invention have a very high color forming property.

EXAMPLE 6

A coated paper was obtained in the same manner as in Example 2, except that 10 g of p-N-ethyl-N-phenylsulfamoylphenol was used as the electron accepting compounds. When the coated paper was subjected to development by a facsimile, black printed images were obtained.

EXAMPLE 7

A coated pper was obtained in the same manner as in Example 2, except that 10 g of 3-hydroxy-4-N-methyl-N-benzylsulfamoylphenol was used as the electron accepting compounds. When the coated paper was subjected to development by a facsimile, black printed images were obtained.

EXAMPLE 8

5 g of 2-anilino-3-methyl-6-diethylaminofluoran, which was the electron donating colorless dye in 50 g of a 5% aqueous solution of polyvinyl alcohol (saponification value: 99%; degree of polymerization: 1000) by means of a ball mill for about 24 hours. On the other hand, 10 g of 3-hydroxy-4-N-benzylsulfamoylphenol, which was the electron accepting compound was dispersed similarly in 100 g of a 5% aqueous solution of polyvinyl alcohol by means of a ball mill for about 24 hours. Further, 10 g of the 2-benzyloxynaphthalene was dispersed in 100 g of a 5% aqueous solution of polyvinyl alcohol by means of a ball mill for about 24 hours. After these three dispersions were blended, 20 g of kaolin (Georgia Kaolin) was added thereto and dispersed therein. Further, 5 g of a 50% paraffin wax emulsion (Chukyo Yushi Cellosol 428) was added thereto to produce a coating solution.

The coating solution was applied to a neutral sizing paper base having an areal weight of 50 $g/m^2$ so as to result in a solid coating amount of 6 $g/m^2$. After the coating was dried at 60° C. for 1 minutes, to obtain a coated paper. When the coated paper was subjected to development by a facsimile, black printed images were obtained.

While the invention has been described in detail and with reference to specific embodiments thereof, it will be apparent to one skilled in the art that various changes and modifications can be made therein without departing from the spirit and scope thereof.

What is claimed is:

1. A pressure-sensitive or heat-sensitive recording material comprising an electron donating colorless dye and an electron accepting compound, wherein the electron accepting compound is an aromatic compound having a substituted or unsubstituted sulfamoyl group and a hydroxyl group as substituents, wherein the electron accepting compound is a compound represented by one of the general formulae (I) to (III):

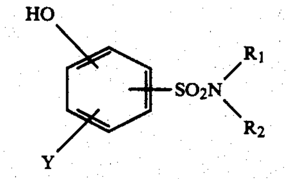

(I)

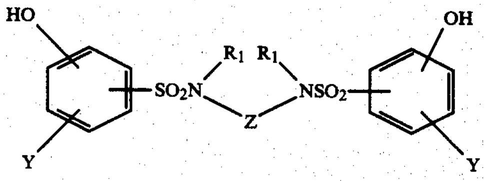

(II)

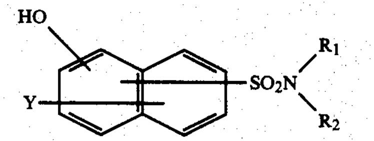

(III)

wherein $R_1$ and $R_2$ independently represent a hydrogen atom, an alkyl group, an aralkyl group or an aryl group, which may be substituted by alkyl groups, halogen atoms, alkoxy groups or hydroxyl groups;

Y is a hydrogen atom, an alkyl group, an aryl group, an aralkyl group, a halogen atom, a hydroxyl group or an electron attractive group;

Z is an alkylene residue, an arylene residue or $-R_3-X-R_4-$ (wherein $R_3$ and $R_4$ independently represent an alkylene residue, and X is an arylene residue or an oxygen atom.

2. A recording material as claimed in claim 1, wherein $R_1$ is a hydrogen atom or an alkyl group containing 1 to 8 carbon atoms.

3. A recording material as claimed in claim 2, wherein $R_1$ is a hydrogen atom or an alkyl group containing 1 to 4 carbon atoms.

4. A recording material as claimed in claim 1, wherein $R_2$ is a hydrogen atom, an alkyl group containing 1 to 8 carbon atoms, an aralkyl group containing 7 to 12 carbon atoms, or an aryl group containing 6 to 12 carbon atoms.

5. A recording material as claimed in claim 4, wherein $R_2$ is a hydrogen atom, an alkyl group containing 1 to 6 carbon atoms, an aralkyl group containing 7 to 10 carbon atoms, an aryl group containing 6 to 10 carbon atoms, a halogen substituted aryl group, an alkoxy substituted aryl group or a hydroxyl substituted aryl group.

6. A recording material as claimed in claim 1, wherein Y is a hydrogen atom, an alkyl group containing 1 to 8 carbon atoms, an aralkyl group containing 7 to 12 carbon atoms, an aryl group containing 6 to 12 carbon atoms, a chlorine atom, a bromine atom, hyroxyl group, or an electron attractive group containing 18 or less carbon atoms.

7. A recording material as claimed in claim 6, wherein Y is a hydrogen atom, an alkyl group containing 1 to 4 carbon atoms, an aralkyl group containing 7 to 9 carbon atoms, an aryl group containing 6 to 9 carbon atoms, a chlorine atom, a hydroxyl group, an acyl group containing 1 to 8 carbon atoms, a substituted carbamoyl group having 2 to 9 carbon atoms, a sulfamoyl group containing 1 to 8 carbon atoms or a substituted sulfamoyl group containing 1 to 8 carbon atoms.

8. A recording material as claimed in claim 1, wherein Z is an alkylene residue having 2 to 10 carbon atoms, an arylene residue containing 6 to 12 carbon atoms or $-R_3-X-R_4-$ having 2 to 12 carbon atoms.

9. A recording material as claimed in claim 1, wherein the electron accepting compound is a compound represented by the general formulae (IV) to (VI):

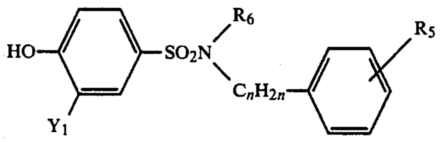

(IV)

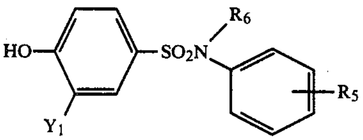

(V)

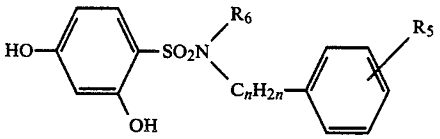

(VI)

wherein $R_6$ represents a hydrogen atom or an alkyl group having 1 to 4 carbom atoms, $R_5$ represents a hydrogen atom, an alkyl group having 1 to 4 carbon atoms, an alkoxy group having 1 to 4 carbon atoms, or a chlorine atom, $Y_1$ represents a hydrogen atom, an alkyl group having 1 to 4 carbon atoms or a chlorine atom, and n is an integer from 1 to 4.

10. A recording material as claimed in claim 1, wherein the electron accepting compound has a melting point of 50° C. or more.

11. A recording material as claimed in claim 10, wherein the electron accepting compound has a melting point in the range of 70° C. to 200° C.

12. A recording material as claimed in claim 1, which is a pressure-sensitive recording material.

13. A recording material as claimed in claim 1, which is a heat-sensitive recording material.

14. A recording material as claimed in claim 1, wherein $R_1$ and $R_2$ are not simultaneously hydrogen or lower alkyl, wherein $R_1$ is not hydrogen and $R_2$ is not lower alkyl, wherein $R_1$ and $R_2$ are not simultaneously aryl or wherein $R_1$ is hydrogen and $R_2$ is an aryl group.

15. A recording material as claimed in claim 13, wherein the electron accepting compound has a melting point of 50° C. or more.

16. A recording material as claimed in claim 12, which comprises a pair of sheets where the electron donating colorless dye and the electron accepting compound are present on separate sheets.

17. A recording material as claimed in claim 16, wherein the electron donating colorless dye is dissolved in a solvent and then encapsulated.

18. A recording material as claimed in claim 16, wherein from 0.1 to 6 g of the electron accepting compound and 0.1 to 10 g of a binder is used based on 1 $m^2$ of the sheet carrying the electron accepting compound and binder.

19. A recording material as claimed in claim 13, which further comprises a thermally fusible substance.

20. A recording material as claimed in claim 19, which comprises 0.1 to 2 g of the electron donating colorless dye, 0.1 to 6 g of the electron accepting compound, up to 6 g of the thermally diffusible substance and 0.1 to 10 g of binders based on 1 $m^2$ of the heat-sensitive recording material.

* * * * *